US007005394B1

(12) United States Patent
Ylitalo et al.

(10) Patent No.: US 7,005,394 B1
(45) Date of Patent: Feb. 28, 2006

(54) TACKIFIED THERMOPLASTIC-EPOXY PRESSURE SENSITIVE ADHESIVES

(75) Inventors: Caroline M. Ylitalo, Stillwater, MN (US); Mario A. Perez, Burnsville, MN (US); Edward G. Stewart, White Bear Township, MN (US); Patrick D. Hyde, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/114,027

(22) Filed: Jul. 10, 1998

(51) Int. Cl.
*B32B 7/12* (2006.01)

(52) U.S. Cl. ............... 442/151; 442/175; 442/329; 442/400; 428/355 EP; 428/413; 525/89; 525/314; 525/338; 525/383; 525/250

(58) Field of Classification Search ........... 525/89, 525/314, 338, 383, 250; 428/355 EP, 413; 442/151, 175, 329, 400
See application file for complete search history.

(56) References Cited

U.S. PATENT DOCUMENTS

| | | | |
|---|---|---|---|
| 2,807,648 A | 9/1957 | Pitt ........................... 260/607 |
| 3,338,992 A | 8/1967 | Kinney et al. .................. 264/24 |
| 3,502,763 A | 3/1970 | Hartmann et al. ........... 264/210 |
| 3,692,618 A | 9/1972 | Dorschner et al. ............. 161/72 |
| 4,250,053 A | 2/1981 | Smith ........................ 252/426 |
| 4,256,828 A | 3/1981 | Smith ........................ 430/280 |
| 4,405,297 A | 9/1983 | Appel et al. .................. 425/72 |
| 4,522,965 A | 6/1985 | Waniczek et al. |
| 4,684,678 A | 8/1987 | Schultz et al. ............... 523/466 |
| 4,707,388 A * | 11/1987 | Park et al. ...................... 428/36 |
| 4,789,699 A | 12/1988 | Kieffer et al. |
| 5,059,701 A | 10/1991 | Keipert ........................ 556/13 |
| 5,176,952 A | 1/1993 | Joseph et al. ............... 428/284 |
| 5,191,101 A | 3/1993 | Palazzotto et al. ............ 556/47 |
| 5,202,361 A | 4/1993 | Zimmerman et al. ....... 522/120 |
| 5,232,770 A | 8/1993 | Joseph ........................ 428/284 |
| 5,238,733 A | 8/1993 | Joseph et al. ............... 428/284 |
| 5,248,455 A | 9/1993 | Joseph et al. .................. 264/6 |
| 5,252,694 A | 10/1993 | Willett et al. ............... 525/404 |
| 5,258,220 A | 11/1993 | Joseph ........................ 428/284 |
| 5,356,993 A | 10/1994 | Erickson et al. .............. 525/89 |
| 5,470,622 A * | 11/1995 | Rinde et al. ................ 428/34.9 |
| 5,470,633 A | 11/1995 | Darfler ........................ 428/116 |
| 5,554,664 A | 9/1996 | Lamanna et al. ............ 522/25 |
| 5,593,759 A * | 1/1997 | Vargas et al. ............... 428/200 |

FOREIGN PATENT DOCUMENTS

| | | |
|---|---|---|
| EP | 137545 | 4/1985 |
| JP | 5186747 | 7/1993 |
| JP | 6145647 | 5/1994 |
| WO | WO 9730132 | 8/1997 |

* cited by examiner

*Primary Examiner*—Daniel Zirker
(74) *Attorney, Agent, or Firm*—Philip Y. Dahl

(57) ABSTRACT

A pressure sensitive adhesive composition comprised of: a) 75 to 99.9 weight percent of a tackified thermoplastic polymer component comprising 1) 1–99 weight percent of a thermoplastic polymer substantially without epoxy-binding or ester functions, and 2) 1–99 weight percent of a tackifier; and b) 0.1 to 25 weight percent of an epoxy component comprising a cured epoxy and non-woven webs made of this adhesive composition.

12 Claims, No Drawings

TACKIFIED THERMOPLASTIC-EPOXY PRESSURE SENSITIVE ADHESIVES

FIELD OF THE INVENTION

This invention relates to a pressure sensitive adhesive composition comprised of: a) 75 to 99.9 weight percent of a tackified thermoplastic polymer component comprising 1) 1–99 weight percent of a thermoplastic polymer without epoxy-binding or ester functions, and 2) 1–99 weight percent of a tackifier; and b) 0.1 to 25 weight percent of an epoxy component comprising a cured epoxy; and nonwoven webs made of this adhesive composition.

BACKGROUND OF THE INVENTION

It is known in the art to make pressure-sensitive adhesive compositions that include elastomeric polymers and tackifying resins.

U.S. Pat. No. 5,470,622 discloses a method for joining two substrates such as pipes with a heat-curable, non-sticky adhesive composition. The composition comprises 90 to 25 parts of an uncured thermoset resin, which may be epoxy, and 10 to 75 parts of an essentially amorphous thermoplastic resin. The reference teaches that adhesion is obtained by heat cure in situ. This reference does not disclose compositions falling within the bounds of the present invention. Further, this reference does not teach the inclusion of a tackifier and does not teach or disclose a pressure sensitive adhesive composition. To the contrary, the compositions obtained are intended to be, and are, non-sticky (See, e.g., '622 at col. 3, lns. 26–30 and 48–50 and col. 7, lns. 13–20).

U.S. Pat. No. 5,356,993 discloses a composition comprising a mixture of two different epoxidized polymers and an optional tackifier, wherein the two different epoxidized polymer components separate upon cure. This reference does not disclose a composition containing a thermoplastic as a majority component.

EP 137,545 discloses an article made from a blend of polyphenylene ether, high impact polystyrene and an epoxy resin which is coated with a lacquer or adhesive. The reference does not teach inclusion of a tackifier and does not teach preparation of a pressure sensitive adhesive. The reference does not teach curing the epoxy component or the inclusion of any curative or catalyst.

SUMMARY OF THE INVENTION

Briefly, the present invention provides a pressure sensitive adhesive comprised of: a) 75 to 99.9 weight percent of a tackified thermoplastic polymer component comprising 1) 1–99 weight percent of a thermoplastic polymer without epoxy-binding or ester functions, and 2) 1–99 weight percent of a tackifier; and b) 0.1 to 25 weight percent of an epoxy component comprising a cured epoxy.

In another aspect, the present invention provides a non-woven web comprising the adhesive of the present invention. The web preferably remains porous after application.

What has not been described in the art, and is provided by the present invention, is a pressure sensitive adhesive including a tackified thermoplastic as a majority component and a cured epoxy component which may additionally be used in a nonwoven web to provide a breathable adhesive.

In this application:

"curing agent," for epoxy, means an epoxy curative or an epoxy catalyst;

"substituted" means substituted by conventional substituents which do not interfere with the desired product, e.g., substituents can be alkyl, alkoxy, aryl, phenyl, halo (F, Cl, Br, I), cyano, nitro, etc.

It is an advantage of the present invention to provide a pressure sensitive adhesive which may be extruded or blown into microfibers for collection as a non-woven web. It is a further advantage of the present invention to provide a non-woven pressure sensitive adhesive which retains porosity and therefore breathability after application.

DETAILED DESCRIPTION OF PREFERRED EMBODIMENTS

The present invention provides a pressure sensitive adhesive comprised of: a) 75 to 99.9 weight percent of a tackified thermoplastic polymer component comprising 1) 1–99 weight percent of a thermoplastic polymer without epoxy-binding or ester functions, and 2) 1–99 weight percent of a tackifier; and b) 0.1 to 25 weight percent of an epoxy component comprising a cured epoxy.

Any suitable thermoplastic polymer without epoxy-binding functions may be employed in the present invention. Preferred thermoplastics include elastomeric polymers such as rubbers, polyisoprenes, polybutadienes, and the like, including copolymers thereof. One such preferred polymer is Kraton™ D1107 (available from Shell Chemicals, Inc., Houston, Tex.), a thermoplastic styrene-isoprene-styrene block copolymer. Other suitable thermoplastic polymers may include polystyrenes and copolymers thereof, including high impact polystyrenes (HIPS), polyphenylene ethers (PPE's) and polyolefins including poly-alpha-olefins such as poly-alpha-propylene, poly-alpha-hexene and poly-alpha-octene.

The thermoplastic polymer is substantially without epoxy-binding functions which react to form bonds with epoxy groups. Such epoxy-binding functions include amine, hydroxy and mercaptan functions, carboxyl functions and their derivatives, including anhydrides and acid halides, and epoxy functions themselves. In addition, the thermoplastic polymer is substantially without ester functions. Polymers containing ester functions may be found to contain some proportion of epoxy-binding carboxyl or hydroxy functions. The inventors have found that ester-functional polymers provided poor extrusion properties when used in the present invention. The thermoplastic polymer is substantially without epoxy-binding or ester functions if it contains less than one such function per 10,000 molecular weight of polymer and preferably less than one such function per 100,000 molecular weight of polymer.

Any suitable tackifier may be employed in the present invention. The tackifier is present as 1–99 weight percent of the tackified thermoplastic polymer component. Preferably the tackifier is present in a proportion of more than 25 wt % and most preferably more than 40 wt %. Preferably the tackifier is present in a proportion of not more than 75 wt % and most preferably not more than 60 wt %. Useful tackifiers include rosin esters, aliphatic and aromatic hydrocarbon resins and mixtures thereof, and terpene resins. Useful rosin esters can include the Hercoflex™, Hercolyn™, and Foral™ families of rosin and hydrogenated rosin tackifiers, commercially available from Hercules Chemical Specialties Co., Wilmington, Del. Useful aliphatic and aromatic hydrocarbon resins can include the Wingtack™ and Wingtack™ Plus families of aliphatic and mixed aliphatic/aromatic resins, commercially available from Goodyear Tire and Rubber Co., Chemical Div., Akron, Ohio; the Escorez™ family of aliphatic, aromatic and mixed aliphatic/aromatic resins, commercially available from Exxon Chemical Co., Houston, Tex.; and the Piccotac™ and Regalrez™ families of aliphatic and aromatic resins, commercially available from Hercules. Useful terpene resin tackfiers can include the Zonarez™ family of terpenes, commercially available from Arizona Chemical Div., International Paper Co., Panama City, Fla., and the Piccolyte™ and Piccofyn™ families of terpenes, commercially available from Hercules. Preferably, tackifiers useful in the invention include Escorez™ mixed aliphatic/aromatic hydrocarbon tackfiers.

Preferably the thermoplastic and tackifier components are pre-mixed to form a tackified thermoplastic. Most preferably, this mixture is supplied in pellet form for easier processing.

The epoxy component may be any suitable thermosettable epoxy resin. The epoxy is present as 0.1–25 weight percent of the adhesive composition but preferably not more than 15 wt %, and most preferably not more than 10 wt %. Preferably the epoxy is present as at least 5 wt % of the adhesive composition. When the adhesive composition is used in a non-woven web, the epoxy component is preferably 10–25% and more preferably 15–22% by weight of the adhesive composition.

Thermosettable epoxy resins useful in the present invention preferably comprise compounds which contain one or more 1,2-, 1,3- and 1,4-cyclic ethers, which also may be known as 1,2-, 1,3- and 1,4-epoxides. The 1,2-cyclic ethers are preferred. Such compounds can be saturated or unsaturated, aliphatic, alicyclic, aromatic or heterocyclic, or can comprise combinations thereof. Compounds that contain more than one epoxy group (i.e., polyepoxides) are preferred.

Aromatic polyepoxides (i.e., compounds containing at least one aromatic ring structure, e.g., a benzene ring, and more than one epoxy group) that can be used in the present invention include the polyglycidyl ethers of polyhydric phenols, such as Bisphenol A-type resins and their derivatives, epoxy cresol-novolac resins, Bisphenol-F resins and their derivatives, and epoxy phenol-novolac resins; and glycidyl esters of aromatic carboxylic acids, e.g., phthalic acid diglycidyl ester, isophthalic acid diglycidyl ester, trimellitic anhydride triglycidyl ester, and pyromellitic acid tetraglycidyl ester, and mixtures thereof. Preferred aromatic polyepoxides are the polyglycidyl ethers of polyhydric phenols, such as the EPON™ series of diglycidyl ethers of Bisphenol-A, including EPON 828 and EPON 1001F, available commercially from Shell Chemicals, Inc., Houston, Tex. Representative aliphatic cyclic polyepoxides (i.e., cyclic compounds containing one or more saturated carbocyclic rings and more than one epoxy group, also known as alicyclic compounds) useful in the present invention include the "ERL™" series of alicyclic epoxides commercially available from Union Carbide Corp., Danbury, Conn., such as vinyl cyclohexene dioxide (ERL-4206), 3,4-epoxycyclohexylmethyl-3,4-epoxycyclohexane carboxylate (ERL-4221), 3,4-epoxy-6-methylcyclohexylmethyl-3,4-epoxy-6-methylcyclohexane carboxylate (ERL-4201), bis(3,4-epoxy-6-methylcycylohexylmethyl)adipate (ERL-4289), dipentene dioxide (ERL-4269), as well as 2-(3,4-epoxycyclohexyl-5,1"-spiro-3",4"-epoxycyclohexane-1,3-dioxane, 4-(1,2-epoxyethyl)-1,2-epoxycyclohexane and 2,2-bis(3,4-epoxycyclohexyl)propane. Preferred alicyclic polyepoxides include the ERL™ series.

Representative aliphatic polyepoxides (i.e., compounds containing no carbocyclic rings and more than one epoxy group) include 1,4-bis(2,3-epoxypropoxy)butane, polyglycidyl ethers of aliphatic polyols such as glycerol, polypropylene glycol, 1,4-butanediol, and the like, and the diglycidyl ester of linoleic dimer acid.

Suitable curatives or catalysts preferably tolerate melt processing without substantially curing the epoxy component, while retaining the ability to cure the epoxy component at a later time under the influence of heat or light. Most preferably, the epoxy should remain substantially uncured after exposure to the temperature present in the melt processing step for the duration of the melt processing step. Other factors that influence catalyst selection include the thickness of the film to be cured, transparency of the film to curing radiation, and the film's end use (for example, when the final use of the film occurs after orientation or stretching, use of a thermal catalyst may not be appropriate, since the thermal activation may compromise the degree of orientation or the structural integrity of the stretched film). Subject to these limitations, suitable curatives may be selected from any known catalysts.

Curatives of the present invention can be photocatalysts or thermal curing agents.

Known photocatalysts include two general types: onium salts and cationic organometallic salts, which are both useful in the invention.

Onium salt photocatalysts for cationic polymerizations include iodonium and sulfonium complex salts. Useful aromatic iodonium complex salts are of the general formula:

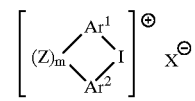

wherein

Ar$^1$ and Ar$^2$ can be the same or different and are aromatic groups having from 4 to about 20 carbon atoms, and are selected from the group consisting of phenyl, thienyl, furanyl, and pyrazolyl groups;

Z is selected from the group consisting of oxygen, sulfur, a carbon—carbon bond,

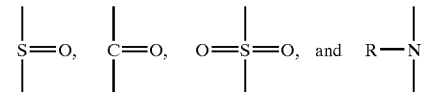

wherein R can be aryl (having from 6 to about 20 carbon atoms, such as phenyl) or acyl (having from 2 to about 20 carbon atoms, such as acetyl, or benzoyl), and

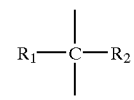

wherein R$_1$ and R$_2$ are selected from the group consisting of hydrogen, alkyl radicals having from 1 to about 4 carbon atoms, and alkenyl radicals having from 2 to about 4 carbon atoms;

m is zero or 1; and

X may have the formula DQ$_n$, wherein D is a metal from Groups IB to VIII or a metalloid from Groups IIIA to VA of the Periodic Chart of the Elements (Chemical Abstracts version), Q is a halogen atom, and n is an integer having a value of from 1 to 6. Preferably, the metals are copper, zinc, titanium, vanadium, chromium, magnesium, manganese, iron, cobalt, or nickel and the metalloids preferably are boron, aluminum, antimony, tin, arsenic and phosphorous. Preferably, the halogen, Q, is chlorine or fluorine. Illustrative of suitable anions are $BF_4^-$, $PF_6^-$, $SbF_6^-$, $FeCl_4^-$, $SnCl_5^-$, $AsF_6^-$, $SbF_5OH^-$, $SbCl_6^-$, $GaCl_4^-$, $InF_4^-$, $ZrF_6^-$, $CF_3SO_3^-$, and the like. Preferably, the anions are $BF_4^-$, $PF_6^-$, $SbF_6^-$, $AsF_6^-$, $SbF_5OH^-$, and $SbCl_6^-$. More preferably, the anions are $SbF_6^-$, $AsF_6^-$, and $SbF_5OH^-$.

Additional anions useful as the anionic portion of the catalysts and initiators of the present invention have been described in U.S. Pat. No. 5,554,664, incorporated herein by reference. The anions may be generally classified as fluorinated (including highly fluorinated and perfluorinated) tris alkyl- or arylsulfonyl methides and corresponding bis alkyl- or arylsulfonyl imides, as represented by Formulas X and Y, respectively, and hereinafter referred to as "methide" and "imide" anions, respectively, for brevity, $$(R_fSO_2)_3C^- \quad (X)$$

$$(R_fSO_2)_2N^- \quad (Y)$$

wherein each $R_f$ is independently selected from the group consisting of highly fluorinated or perfluorinated alkyl or fluorinated aryl radicals. The methides and imides may also be cyclic, when a combination of any two $R^f$ groups are linked to form a bridge.

The $R_f$ alkyl chains may contain from 1–20 carbon atoms, with 1–12 carbon atoms preferred. The $R_f$ alkyl chains may be straight, branched, or cyclic and preferably are straight. Heteroatoms or radicals such as divalent oxygen, trivalent nitrogen or hexavalent sulfur may interrupt the skeletal chain, as is well recognized in the art. When $R_f$ is or contains a cyclic structure, such structure preferably has 5 or 6 ring members, 1 or 2 of which can be heteroatoms. The alkyl radical $R_f$ is also free of ethylenic or other carbon—carbon unsaturation: e.g., it is a saturated aliphatic, cycloaliphatic or heterocyclic radical. By "highly fluorinated" is meant that the degree of fluorination on the chain is sufficient to provide the chain with properties similar to those of a perfluorinated chain. More particularly, a highly fluorinated alkyl group will have more than half the total number of hydrogen atoms on the chain replaced with fluorine atoms. Although hydrogen atoms may remain on the chain, it is preferred that all hydrogen atoms be replaced with fluorine to form a perfluoroalkyl group, and that any hydrogen atoms beyond the at least half replaced with fluorine that are not replaced with fluorine be replaced with bromine and or chlorine. It is more preferred that at least two out of three hydrogens on the alkyl group be replaced with fluorine, still more preferred that at least three of four hydrogen atoms be replaced with fluorine and most preferred that all hydrogen atoms be replaced with fluorine to form a perfluorinated alkyl group.

The fluorinated aryl radicals of Formulas 2a and 2b may contain from 6 to 22 ring carbon atoms, preferably 6 ring carbon atoms, where at least one, and preferably at least two, ring carbon atoms of each aryl radical is substituted with a fluorine atom or a highly fluorinated or perfluorinated alkyl radical as defined above, e.g., $CF_3$.

Examples of anions useful in the practice of the present invention include: $(C_2F_5SO_2)_2N^-$, $(C_4F_9SO_2)_2N^-$, $(C_8F_{17}SO_2)_3C^-$, $(CF_3SO_2)_3C^-$, $(CF_3SO_2)_2N^-$, $(C_4F_9SO_2)_3C^-$, $(CF_3SO_2)_2(C_4F_9SO_2)C^-$, $(CF_3SO_2)(C_4F_9SO_2)N^-$, $[(CF_3)_2NC_2F_4SO_2]_2N^-$, $(CF_3)_2NC_2F_4SO_2C^-(SO_2CF_3)_2$, $(3,5\text{-bis}(CF_3)C_6H_3)SO_2N^-SO_2CF_3$,

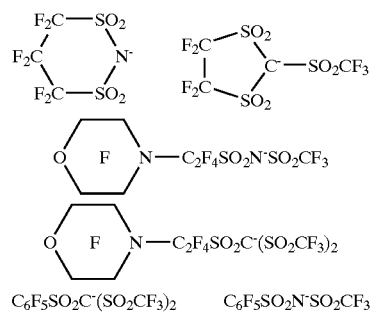

$C_6F_5SO_2C^-(SO_2CF_3)_2 \quad C_6F_5SO_2N^-SO_2CF_3$ and the like. More preferred anions are those described by Formula X wherein $R_f$ is a perfluoroalkyl radical having 1–4 carbon atoms.

The $Ar_1$ and $Ar_2$ aromatic groups may optionally comprise one or more fused benzo rings (e.g., naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Useful aromatic iodonium complex salts are described more fully in U.S. Pat. No. 5,256,828, which is incorporated herein by reference.

The aromatic iodonium complex salts useful in the invention are photosensitive only in the ultraviolet region of the spectrum. However, they can be sensitized to the near ultraviolet and the visible range of the spectrum by sensitizers for known photolyzable organic halogen compounds. Illustrative sensitizers include aromatic amines and colored aromatic polycyclic hydrocarbons, as described in U.S. Pat. No. 4,250,053, incorporated herein by reference.

Aromatic sulfonium complex salt catalysts suitable for use in the invention are of the general formula

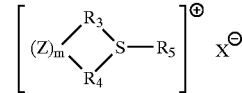

wherein
$R_3$, $R_4$ and $R_5$ can be the same or different, provided that at least one of the groups is aromatic. These groups can be selected from the group consisting of aromatic moieties having from 4 to about 20 carbon atoms (e.g., substituted and unsubstituted phenyl, thienyl, and furanyl) and alkyl radicals having from 1 to about 20 carbon atoms. The term "alkyl" includes substituted alkyl radicals (e.g., substituents such as halogen, hydroxy, alkoxy, and aryl). Preferably, $R_3$, $R_4$ and $R_5$ are each aromatic; and
Z, m and X are all as defined above with regard to the iodonium complex salts.

If $R_3$, $R_4$ or $R_5$ is an aromatic group, it may optionally have one or more fused benzo rings (e.g., naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Triaryl-substituted salts such as triphenylsulfonium hexafluoroantimonate and p-(phenyl(thiophenyl))diphenylsulfonium hexafluoroantimonate are preferred sulfonium salts. Triphenylsulfonium hexafluoroantimonate ($Ph_3SSbF_6$) is a most preferred catalyst. Useful sulfonium salts are described more fully in U.S. Pat. No. 5,256,828, which is incorporated herein by reference.

Aromatic sulfonium complex salts useful in the invention are photosensitive only in the ultraviolet region of the spectrum. However, they can be sensitized to the near ultraviolet and the visible range of the spectrum by a select group of sensitizers such as described in U.S. Pat. Nos. 4,256,828 and 4,250,053, which are incorporated herein by reference.

Suitable photoactivatable organometallic complex salts useful in the invention include those described in U.S. Pat. Nos. 5,059,701, 5,191,101, and 5,252,694, each of which is incorporated herein by reference. Such salts of organometallic cations have the general formula:

$$[(L^1)(L^2)M^m]^{+e}X^-$$

wherein $M^m$ represents a metal atom selected from elements of periodic groups IVB, VB, VIIB, VIIB and VIII, preferably Cr, Mo, W, Mn, Re, Fe, and Co; $L^1$ represents none, one, or two ligands contributing π-electrons that can be the same or different ligand selected from the group consisting of substituted and unsubstituted acyclic and cyclic unsaturated compounds and groups and substituted and unsubstituted carbocyclic aromatic and heterocyclic aromatic compounds, each capable of contributing two to twelve π-electrons to the valence shell of the metal atom M. Preferably, $L^1$ is selected from the group consisting of substituted and unsubstituted $\eta^3$-allyl, $\eta^5$-cyclopentadienyl, $\eta^7$-cycloheptatrienyl compounds, and $\eta^6$-aromatic compounds selected from the group consisting of $\eta^6$-benzene and substituted $\eta^6$-benzene compounds (e.g., xylenes) and compounds having 2 to 4 fused rings, each capable of contributing 3 to 8 π-electrons to the valence shell of $M^m$; $L^2$ represents none or 1 to 3 ligands contributing an even number of σ-electrons that can be the same or different ligand selected from the group consisting of carbon monoxide, nitrosonium, triphenyl phosphine, triphenyl stibine and derivatives of phosphorous, arsenic and antimony, with the proviso that the total electronic charge contributed to $M^m$ by $L^1$ and $L^2$ results in a net residual positive charge of e to the complex; and e is an integer having a value of 1 or 2, the residual charge of the complex cation; X is a halogen-containing complex anion, as described above.

Certain thermally-activated curing agents for epoxy resins (e.g., compounds that effect curing and crosslinking of the epoxide by entering into a chemical reaction therewith) can be useful in the present invention. Preferably, such curing agents are thermally stable at temperatures at which mixing of the components takes place.

Suitable thermal curing agents include aliphatic and aromatic primary and secondary amines, e.g., di(4-aminophenyl)sulfone, di(4-aminophenyl)ether, and 2,2-bis-(4-aminophenyl)propane; aliphatic and aromatic tertiary amines, e.g., dimethylaminopropylamine and pyridine; quaternary ammonium salts, particularly pyridinium salts such as N-methyl-4-picolinium hexafluorophosphate; sulfoninum salts; fluorene diamines, such as those described in U.S. Pat. No. 4,684,678, incorporated herein by reference; boron trifluoride complexes such as $BF_3.Et_2O$ and $BF_3.H_2NC_2H_5OH$; imidazoles, such as methylimidiazole; hydrazines, such as adipohydrazine; and guanidines, such as tetramethylguanidine and dicyandiamide (cyanoguanimide, commonly known as DiCy).

Additional high temperature thermal epoxy catalysts that can be particularly useful in the present invention include simple pyridinium, quinolinium, indolinium, benzothiazolium, alkyl, aryl and alkylaryl ammonium, sulfonium and phosphonium salts. These are effective initiators of the cationic polymerization of epoxies in the 250–350° C. temperature range. Because of these high exotherm temperatures, these catalysts are particularly suited to use with extrusion temperatures of 200° C. or greater. The compositions are stable in the extruder (i.e., they do not cure), eliminating problems that would be caused by crosslinking during this processing step. Useful ammonium and phosphonium salts are described in copending application U.S. Ser. No. 08/782,476, the teachings of which are incorporated herein by reference.

Catalysts useful in the invention can be present in an amount in the range of 0.01 to 10 weight percent, based on total epoxy resin composition, preferably 0.1 to 5 weight percent, and most preferably 0.5 to 3 weight percent. Catalysts may be added to the chosen epoxy in a powder form at temperatures up to about 150° C. No solvent is necessary for this operation. Incorporation time can range from 10–20 minutes depending on the epoxy/catalyst system. The epoxy/catalyst may then be pumped into the extruder for the melt processing step. Alternatively, the catalyst could be added directly into the thermoplastic/epoxy mixture during melt blending.

Various adjuvants can also be added to the compositions of the invention to alter the physical characteristics of the final material. Included among useful adjuvants are thixotropic agents such as fumed silica; pigments to enhance color tones such as ferric oxide, carbon black and titanium dioxide; fillers such as mica, silica, acicular wollastonite, calcium carbonate, magnesium sulfate and calcium sulfate; electrically and/or thermally conductive fillers, including metal particles, graphite, and metal-coated microspheres; chopped fibers and whiskers, including glass and carbon; clays such as bentonite; glass beads and bubbles; reinforcing materials such as unidirectional woven and nonwoven webs of organic and inorganic fibers such as polyester, polyimide, glass fibers, polyamides such as poly(p-phenylene terephthalamide), carbon fibers, and ceramic fibers.

The composition of the present invention can be prepared by batch or continuous processing.

Batch processing can be accomplished by adding solid thermoplastic and tackifier to a preheated mixer, such as a Brabender mixer (C. W. Brabender Instruments, Inc., South Hackensack, N.J.) equipped with, e.g., cam or sigma blades. After stirring for about 5 minutes, the thermoplastic is melted and a mixture of epoxy and curative for the epoxy is added with continued stirring. The resultant mixture is stirred to ensure complete mixing, at a duration and temperature below that which would substantially cure the epoxy component, and removed from the mixer while still molten. The mixture can then be molded, formed, shaped or pressed into a desired final configuration. The shaped object may then be irradiated and/or heated to cure the epoxy resin component. In particular, when a thin sheet or film is desired, the molten mass can be pressed in a heated flat-plate press, such as a Carver laboratory press (F. Carver, Inc., Wabash, Ind.).

Continuous processing can be accomplished using an extruder, e.g., a twin-screw extruder, equipped with a downstream port, a static mixer and an appropriate output orifice (film die, sheet die, fiber die, profile die, etc.) and a take-up or casting roll and wind-up roll(s), as appropriate. The casting roll may be cooled or maintained at a set temperature by thermostatic means. Solid thermoplastic and tackifier are added to the input end of the extruder and processed using a temperature profile that is appropriate for the thermoplastic and which will not substantially cure the epoxy component, taking into account the duration of residence of the material in the extruder during processing. Preferably, the thermoplastic and tackifier are premixed or obtained as a blend in pellet form. The epoxy component may be injected via gear or syringe pump. Take-up line speed is adjusted as appropriate for the output (sheet, fiber, etc.), typically from about 0.5 m/min to about 200 m/min.

The epoxy may be cured by any appropriate means. Preferably, the curing means does not adversely affect other components of the composition, e.g. by yellowing or weakening other components.

In the cases where thermal curing of the epoxy is desirable immediately after extrusion, i.e., before the thermoplastic polymer cools and solidifies, further heating of the extrudate can take place directly at the die orifice or at a casting wheel. When it is desired that epoxy cure take place after the thermoplastic polymer cools and solidifies, the heat source (s) can be located just prior to the take-up roll. Finally, when it is desirable that no epoxy curing take place after extrusion such heating devices are absent.

In the case where photocuring of the epoxy is desirable immediately after extrusion, i.e., before the thermoplastic polymer cools and solidifies, UV irradiation of the heated extrudate can take place directly at the die orifice. Irradiation can be accomplished by any number of commercially-available UV sources, such as one or more Fusion Systems D or H bulbs (available from Fusion UV Curing Systems, Rockville, Md.) or Sylvania BL 350 bulbs. When it is desired that epoxy cure take place after the thermoplastic polymer cools and solidifies, the light source(s) can be located just prior to the take-up roll. Finally, where it is desirable that no immediate epoxy curing take place after extrusion, the irradiation devices are absent and precautions may be taken to prevent UV exposure.

It is within the scope of the invention that a film, obtained from a sheet die, may be drawn either uniaxially or biaxially as it emerges from the die. Cure, as above, may take place before, during or after such drawing.

Where a film is used as an adhesive or coating, the material may be applied to its final substrate in an uncured state as a sheet and cured in situ by application of heat, pressure, UV light, or combinations thereof.

The composition may preferably be blown into microfibers and formed into a non-woven web. This may be accomplished by any suitable process, such as those disclosed in U.S. Pat. No. 3,338,992 (Kinney), U.S. Pat. No. 3,502,763 (Hartmann), U.S. Pat. No. 3,692,618 (Dorschner et al.), and U.S. Pat. No. 4,405,297 (Appel et al.). Such processes include both spunbond processes and melt-blown processes. A preferred method for the preparation of fibers, particularly microfibers, and nonwoven webs thereof, is a melt-blown process. For example, nonwoven webs of multilayer microfibers and melt-blown processes for producing them are disclosed in U.S. Pat. No. 5,176,952 (Joseph et al.), U.S. Pat. No. 5,232,770 (Joseph), U.S. Pat. No. 5,238,733 (Joseph et al.), U.S. Pat. No. 5,258,220 (Joseph), U.S. Pat. No. 5,248,455 (Joseph et al.). These and other melt processes can be used in the formation of the nonwoven webs of the present invention.

Melt-blown processes are particularly preferred because they form autogenously bonded webs that typically require no further processing to bond the fibers together. Such processes use hot (e.g., equal to or about 20° C. to about 30° C. higher than the polymer melt temperature), high-velocity air to draw out and attenuate extruded polymeric material from a die, which will generally solidify after traveling a relatively short distance from the die. The resultant fibers are termed melt-blown fibers and are generally substantially continuous. They form into a coherent web between the exit die orifice and a collecting surface by entanglement of the fibers due in part to the turbulent airstream in which the fibers are entrained.

The solidified or partially solidified fibers form an interlocking network of entangled fibers, which are collected as a coherent web. The collecting surface can be a solid or perforated surface in the form of a flat surface or a drum, a moving belt, or the like. If a perforated surface is used, the backside of the collecting surface can be exposed to a vacuum or low-pressure region to assist in the deposition of the fibers. The collector distance is generally about 7 centimeters (cm) to about 130 cm from the die face. Moving the collector closer to the die face, e.g., about 7 cm to about 30 cm, will result in stronger inter-fiber bonding and a less lofty web.

The size of the polymeric fibers formed depends to a large extent on the velocity and temperature of the attenuating airstream, the orifice diameter, the temperature of the melt stream, and the overall flow rate per orifice. Typically, fibers having a diameter of no greater than about 10 $\mu$m can be formed, although coarse fibers, e.g., up to about 50 $\mu$m or more, can be prepared using a melt-blown process, and up to about 100 $\mu$m, can be prepared using a spun bond process. The webs formed can be of any suitable thickness for the desired and intended end use. Generally, a thickness of about 0.01 cm to about 5 cm is suitable for most applications.

The fibers of the present invention can be mixed with other fibers, such as staple fibers, including inorganic and organic fibers, such as thermoplastic fibers, carbon fibers, glass fibers, mineral fibers, or organic binder fibers. The fibers of the present invention can also be mixed with particulates, such as sorbent particulate material. Typically, this is done prior to the fibers being collected by entraining particulates or other fibers in an airstream, which is then directed to intersect with the fiber streams. Alternatively, other polymer materials can be simultaneously melt processed with the fibers of the present invention to form webs containing more than one type of melt processed fiber, preferably, melt-blown microfiber. Webs having more than one type of fiber are referred to herein as having commingled constructions. In commingled constructions, the various types of fibers can be intimately mixed forming a substantially uniform cross-section, or they can be in separate layers. The web properties can be varied by the number of different fibers used, the number of intrafiber layers employed, and the layer arrangement. Other materials, such as surfactants or binders can also be incorporated into the web before, during, or after its collection, such as by the use of a spray jet.

The nonwoven webs of the present invention can be used to prepare adhesive articles, such as tapes, including medical grade tapes, labels, wound dressings, and the like. That is, the pressure-sensitive adhesive nonwoven webs of the present invention can be used as the adhesive layer on a backing, such as paper, a polymeric film, or a woven or nonwoven web, to form an adhesive article. For example, a nonwoven web of the present invention can be laminated to at least one major surface of a backing. The nonwoven web forms the pressure-sensitive adhesive layer of the adhesive article.

This invention is useful as a pressure sensitive adhesive. This invention is additionally useful as a non-woven pressure sensitive adhesive which retains breathability after application.

Objects and advantages of this invention are further illustrated by the following examples, but the particular materials and amounts thereof recited in these examples, as well as other conditions and details, should not be construed to unduly limit this invention.

EXAMPLES

These materials were used in the following examples:

Kraton™ D1107 (available from Shell Chemicals, Inc., Houston, Tex.) is a thermoplastic styrene-isoprene-styrene block copolymer.

Poly-alpha-octene, (PAO) can be made by synthetic techniques known in the art, such as disclosed in U.S. Pat. No. 5,202,361 at col. 7 In. 53–col. 8 In. 35. The PAO used herein had intrinsic viscosity of 2.67 dl/g.

Escorez™ 1310LC (available from Exxon Chemicals, Houston, Tex.) is a blend of C5 resin tackifiers.

P-90 (obtained from Arakawa Chemical USA Inc.) is an aliphatic tackifier.

Epon™ 828 (available from Shell Chemicals, Inc., Houston, Tex.) is an aromatic epoxy, more specifically a member of the Epon™ series of diglycidyl ethers of Bisphenol-A:

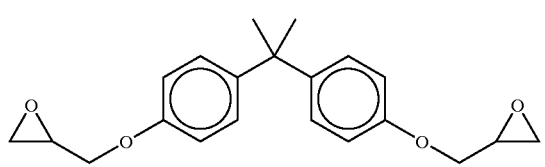

(1)

ERL™ 4221 (available from Union Carbide Corp., Danbury, Conn.) is a cycloaliphatic epoxy, 3,4-epoxycyclohexylmethyl-3,4-epoxycyclohexane carboxylate, which is liquid at room temperature.

Tigum rubber strips were obtained from Belt Services Corp., Earth City, Mo.

The epoxy photocatalyst used was a triaryl sulfonium photocatalyst, $Ph_3S^+SbF_6^-$ synthesized by the method of U.S. Pat. No. 2,807,648.

The epoxy thermocatalyst used was Amicure CG-1400 (available from Air Products and Chemicals, Inc., Allentown, Pa.) which is principally cyanoguanadine, $H_2NC(=NH)NHCN$.

Peel adhesion evaluations were performed generally according to ASTM D 3330-96 (PSTC-1). Unless otherwise noted, 15.24 cm×1.27 cm samples were rolled onto clear glass and allowed to equilibrate for 1 hour. Peel values were obtained at 180° peel using a slip/peel tester model SP-101A (Imass Instruments, Inc., Hingam, Mass.) at 30 cm/min peel rate under conditions of 21° C. and 50% relative humidity. Data were reported as an average of two to four repetitions.

Drop shear evaluations were performed generally according to ASTM 3654-96 (PSTC-7). Unless otherwise noted, 2.54 cm×2.54 cm samples were adhered to stainless steel coupons and suspended with a 1 Kg weight, and the time to complete failure was noted.

Example 1

Samples A–K, discussed below, were mixtures of Kraton™ D1107 thermoplastic, Escorez™ 1310LC tackifier, Epon™ 828 epoxy, Amicure™ CG-1400 curing agent (5% by weight relative to the epoxy) and solvent and had the compositions indicated in Table I:

TABLE I

| Sample | Thermoplastic (gm) | Tackifier (gm) | Epoxy (gm) | Cure Agent (gm) | Solvent (gm) |
|---|---|---|---|---|---|
| A | 15 | 15 | 3.0 | 0.15 | 132* |
| B | 15 | 15 | 6.0 | 0.30 | 144* |
| C | 20 | 10 | 3.0 | 0.15 | 132* |
| D | 20 | 10 | 6.0 | 0.30 | 144* |
| E | 24.0 | 6.0 | 3.0 | 0.15 | 132* |
| F | 24.0 | 6.0 | 6.0 | 0.30 | 144* |
| G | 7.5 | 7.5 | 1.5 | 0.08 | 66** |
| H | 7.5 | 7.5 | 3.0 | 0.15 | 72** |
| I | 7.5 | 7.5 | 1.5 | 0.08 | 66** |
| J | 7.5 | 7.5 | 3.0 | 0.15 | 72** |

*toluene;
**tetrahydrofuran (THF)

Samples A—F were hand coated on 4 mil (0.1 mm) thick PET backing to give a coating thickness of 1 mil (0.025 mm) after being allowed to dry. Strips were then rolled onto tigum rubber with a 5 kg rolling wheel. Some strips with affixed tigum for samples A and B were then thermally cured by sandwiching between teflon-coated steel plates and heating for 15 minutes at 177° C. Peel tests were performed at 30 cm/minute for four repetitions. Upon peeling, samples A, B and D transferred some adhesive to the rubber substrate and samples C, E and F showed complete transfer of adhesive to the rubber substrate. The average results are reported in Table II:

TABLE II

| Sample | Peel, Uncured (N/dm) | Peel, Cured (gm/cm) |
|---|---|---|
| A | 109 | 85 |
| B | 141.7 | 92.7 |
| C | 13.1 | ** |
| D | 54.5 | ** |
| E | NA* | ** |
| F | 13.1 | ** |

*Delamination was too severe to allow measurement
**not measured

Samples G–J were hand coated on 4 mil (0.1 mm) thick PET backing to give coating thicknesses, after being allowed to dry, of 5 mil (0.125 mm) for G and H and 3 mil (0.075 mm) for I and J. Strips were then rolled onto tigum rubber with a 5 kg rolling wheel. Some strips with affixed tigum were then thermally cured by sandwiching between teflon-coated steel plates and heating for 15 minutes at 177° C. Peel tests were performed at 30 cm/minute for three or four repetitions. Upon peeling, samples G–J transferred most of the adhesive to the rubber substrate. The average results are reported in Table III:

TABLE III

| Sample | Peel, Uncured (N/dm) | Peel, Cured (N/dm) |
| --- | --- | --- |
| G (5 mil, 0.125 mm) | 150.4 | 126.4 |
| H (5 mil, 0.125 mm) | 135.2 | 121.0 |
| I (3 mil, 0.075 mm) | 133.0 | 100.3 |
| J (3 mil, 0.075 mm) | 121.0 | 94.8 |

Example 2

Coating runs of three formulations were performed using a 30 mm Werner & Pfleiderer (ZSK-30) co-rotating twin screw extruder with 12 zones. (Werner & Pfleiderer, Germany). The extruder was configured with forward kneading blocks in zones 2, 4, 6 and 8 and forward conveying elements in the remaining zones. The screw speed was 250 RPM and the thermoplastic flow rate was maintained at 4.5 kg/hr.

Tackified Kraton pellets were used for convenience of feeding. The tackified pellets were purchased from H. B. Fuller Company (St. Paul, Minn.) and consisted of 50% by weight Kraton™ D1107 and 50% by weight Escorez 1310LC™, with small amounts of talcum powder to prevent sticking. Liquid Epon™ 828 was used as the epoxy, with 2% by weight of photocatalyst added to the epoxy. The Tackified Kraton pellets were fed into zone 1 of the extruder using a weight loss feeder. The epoxy was fed into zone 5 using a Zenith gear pump. (Zenith Pumps Div., Parker Hannifin Corp., Sanford, N.C.). The weight ratios of thermoplastic/tackifier/epoxy for Samples P (comparative), Q, and R discussed below were 50/50/0, 50/50/5 and 50/50/10, respectively.

Layers of adhesive approximately 30 μm thick were coated on a 50 μm thick PET film. Samples P, Q and R all extruded well with no substantial problems or defects. Samples Q and R were transparent as they exited the die and gradually became turbid. Without being bound by theory, the turbidity is thought to reflect separation of thermoplastic and epoxy phases during cooling of the PSA.

Some samples were left uncured and some were cured by exposure to 0.5 J/cm$^2$ UV-A followed by heating to 100° C. for 10 minutes. Peel tests were performed at 30 cm/minute for seven repetitions on cured and uncured samples. The average results are reported in Table IV:

TABLE IV

| Sample | Peel, Uncured (N/dm) | Peel, Cured (N/dm) |
| --- | --- | --- |
| P (comparative) | 89.8 | 77.8 |
| Q | 56.5 | 75.9 |
| R | 4.7 | 68.6 |

In addition, shear tests were performed two times each on samples P, Q and R. For all three samples, drop shear times were in excess of 10,000 minutes.

Additional shear tests were performed to compare the high temperature performance of samples P and R. The sample materials, coated on a 50 μm thick PET backing, were placed on 2.54 cm square stainless steel shear plates, rolled four times, heated to 180° C., then exposed to 1 J/cm$^2$ UV-A radiation through the backing and placed in an oven at 180° C. under 1, 2, 4, or 8 gram weights. Shear tests were performed on these samples. The measured shear times are reported in Table V:

TABLE V

| | Shear Times (min.) | | | |
| --- | --- | --- | --- | --- |
| Sample | 1 g weight | 2 g weight | 4 g weight | 8 g weight |
| P | 28 | 12 | 5.5 | 3.5 |
| R | 134 | 36 | 19.5 | 13 |

Peel tests were also performed on sample R using tigum rubber as a substrate. Uncured strips of sample R were rolled onto tigum rubber with a 2 kg rolling wheel. Some strips with affixed tigum were then cured by exposure to 1 J/cm$^2$ UV-A radiation through the backing. Peel tests were performed on both of these groups of samples at 30 cm/minute for eight repetitions. The average results are reported in Table VI, below.

Additional peel tests were performed on sample R using a tigum rubber substrate after heating of the substrate and adhesive. Some strips of sample R were cured by exposure to 1 J/cm$^2$ UV-A radiation through the backing and some were left uncured. Cured and uncured strips of sample R were then rolled onto tigum rubber with a 2 kg rolling wheel. The samples were placed under a 28 g weight and heated for 20 minutes at 177° C. After cooling at room temperature, peel tests were performed at 30 cm/minute for four repetitions. The average results are reported in Table VI:

TABLE VI

| Sample | Peel, Uncured (N/dm) | Peel, Cured (N/dm) |
| --- | --- | --- |
| R, no heat | 32.7 | 88.4 |
| R, 177° C. | 70.9 | 160 |

Greater enhancement of performance was seen when the photocure was accomplished on the composition in a molten state. Without wishing to be bound to theory, it is believed that the epoxy becomes miscible in the thermoplastic phase yielding a structure similar to a semi-interpenetrating network upon cure.

Example 3

The procedure of Example 2 was repeated using PAO and P-90 tackifier, except that the PAO and tackifier were seperately fed as follows: The PAO flow rate was kept at 10 lbs/hr. The PAO was fed into zone 1 using a 4" Bonnot single screw extruder kept at 365° F., the tackifier was melted and fed into zone 3 using a Zenith gear pump. Liquid epoxy was fed into zone 5 using a Zenith gear pump. The samples were UV cured several days after coating at a UV A dose of 0.5 J/cm$^2$. Compositions and test results are reported for samples T–W and comparative sample S in Table VII:

TABLE VII

| | Materials | Weight Ratios | Peel, cured (N/dm) | Drop Shear, cured (min.) |
| --- | --- | --- | --- | --- |
| S | PAO/P-90 | 100/30 | 42 | 21 |
| T | PAO/P-90/828 | 100/30/5 | 24 | 78 |
| U | PAO/P-90/828 | 100/30/7 | 36 | 112 |

TABLE VII-continued

| Materials | Weight Ratios | Peel, cured (N/dm) | Drop Shear, cured (min.) |
|---|---|---|---|
| V PAO/P-90/4221 | 100/30/5 | 32 | 47 |
| W PAO/P-90/4221 | 100/30/20 | 37 | 56 |

These results demonstrate acceptable peel values and greatly improved shear values for the materials of the present invention.

Example 4

In this example, blown microfiber (BMF) webs were made from the compositions indicated in Table VIII:

TABLE VIII

| Sample | Thermoplastic (parts by wt.) | Tackifier (parts by wt.) | Epoxy (parts by wt.) |
|---|---|---|---|
| X (comparative) | 50 | 50 | 0 |
| Y | 50 | 50 | 10 |
| Z | 50 | 50 | 26 |

The thermoplastic and tackifier used were Kraton™ D1107 and Escorez 1310LC™, supplied as tackified Kraton™ pellets. The epoxy component was ERL™ 4221, to which was added 2% by weight (relative to the weight of epoxy) of $Ph_3S^+SbF_6^-$.

The BMF samples were made using a ¾"(1.9 cm) Brabender extruder. Extruder and die temperatures were 180° C. Tackified Kraton™ pellets were fed at the throat of the extruder. The liquid epoxy was metered into the throat of the extruder using a Zenith gear pump. (Zenith Pumps Div., Parker Hannifin Corp., Sanford, N.C.). Both materials fed very well. The flow rate was maintained at 2.0 kg/hr. A uniform 25 cm web was collected on silicone coated release paper at a collector distance of 20 cm and a coating weight of 30 g/m².

After collection, the non-woven webs were laminated onto PET film and cured by exposure to 1 J/cm² of UV-A followed by heating to 80° C. for 10 minutes.

The surface area coverage of the adhesive materials was measured by analysis of optical micrographs taken at 50× of BMF webs. The analysis was performed using NIH Image software, available from the NIH, Bethesda, Md., or at their website, www.nih.gov. The results appear in Table VIII, below. Without wishing to be bound by theory, the increased surface area coverage observed with increased epoxy content may be due to increased flow rate.

Peel tests were performed at 30 cm/minute for seven repetitions and drop shear tests were performed using 2.54 cm square samples for two repetitions under the conditions reported preceeding. The results are presented in Table IX.

TABLE IX

| Sample | Surface Area Coverage (%) | Peel (N/dm) | Shear Times (min.) |
|---|---|---|---|
| X (comparative) | 47 | 41.4 | 58 |
| Y | 55 | 47.1 | 59 |
| Z | 58 | 43.4 | 116 |

The ability of the BMF PSA's of the present invention to maintain their porosity was examined in the following test.

Samples X (comparative) and Z were laminated onto PET film and covered with a second layer of PET film. The samples were irradiated with 1 J/cm2 UV-A radiation at room temperature. The samples were then placed in a hot press heated to 180° C. and pressed at 1 metric ton for 30 seconds. Sample Z retained visible porosity, while sample X (comparative) melted and coalesced to form a uniform and non-porous coating. Peel tests were then performed using a 180° peel at 25 cm/min. For both samples, the peeling force was 1 kg/cm. However, sample Z demonstrated a irregular and shocky peel, reflecting its porous nature, while sample X had a smooth peel.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A non-woven web comprising blown microfibers of a pressure sensitive adhesive composition comprising:
   a) 75 to 99.9 weight percent of a tackified thermoplastic polymer component comprising
      1) 1–99 weight percent of a thermoplastic polymer having substantially no epoxy-binding functions or ester functions, and
      2) 1–99 weight percent of a tackifier; and
   b) 0.1 to 25 weight percent of an epoxy component comprising a photocured epoxy.

2. A non-woven web comprising blown microfibers of a pressure sensitive adhesive composition comprising:
   a) 75 to 99.9 weight percent of a tackified thermoplastic polymer component comprising
      1) 1–99 weight percent of a thermoplastic polymer having substantially no epoxy-binding functions or ester functions, and
      2) 1–99 weight percent of a tackifier; and
   b) 0.1 to 25 weight percent of an epoxy component comprising a photocured epoxy;
   wherein said thermoplastic polymer a)1) is an elastomeric polymer.

3. A pressure sensitive adhesive comprising the web of claim 1.

4. A pressure sensitive adhesive comprising the web of claim 2.

5. The non-woven web of claim 1 wherein said composition comprises 10 to 25 weight percent of said epoxy component.

6. The non-woven web of claim 2 wherein said composition comprises 10 to 25 weight percent of said epoxy component.

7. An article comprising the pressure sensitive adhesive of claim 3 wherein said adhesive is porous.

8. An article comprising the pressure sensitive adhesive of claim 4 wherein said adhesive is porous.

9. An article comprising the pressure sensitive adhesive of claim 4 on a substrate.

10. An article according to claim 9 wherein said substrate is rubber.

11. An article comprising the pressure sensitive adhesive of claim 8 on a substrate.

12. An article according to claim 11 wherein said substrate is rubber.

* * * * *

UNITED STATES PATENT AND TRADEMARK OFFICE
CERTIFICATE OF CORRECTION

PATENT NO.   : 7,005,394 B1
DATED        : February 28, 2006
INVENTOR(S)  : Ylitalo et al.

It is certified that error appears in the above-identified patent and that said Letters Patent is hereby corrected as shown below:

<u>Column 3,</u>
Lines 5 and 11, delete "tackflers" and insert -- tackifiers --.
Lines 60-61, delete "2-(3,4-epoxycyclohexyl-5" and insert
-- 2-(3,4-epoxycyclohexyl)-5 --.

<u>Column 5,</u>
Line 34, delete "$R^f$" and insert -- $R_f$ --.

<u>Column 6,</u>
Line 44, delete "formula" and insert -- formula: --.

<u>Column 7,</u>
Line 29, delete "VIIB, VIIB" and insert -- VIB, VIIB --.

Signed and Sealed this

Second Day of May, 2006

JON W. DUDAS
*Director of the United States Patent and Trademark Office*